Feb. 5, 1957
C. W. BRABENDER
2,780,095
METHOD AND APPARATUS FOR DETERMINING
THE SOLID CONTENT OF MATERIALS
Filed Aug. 19, 1953
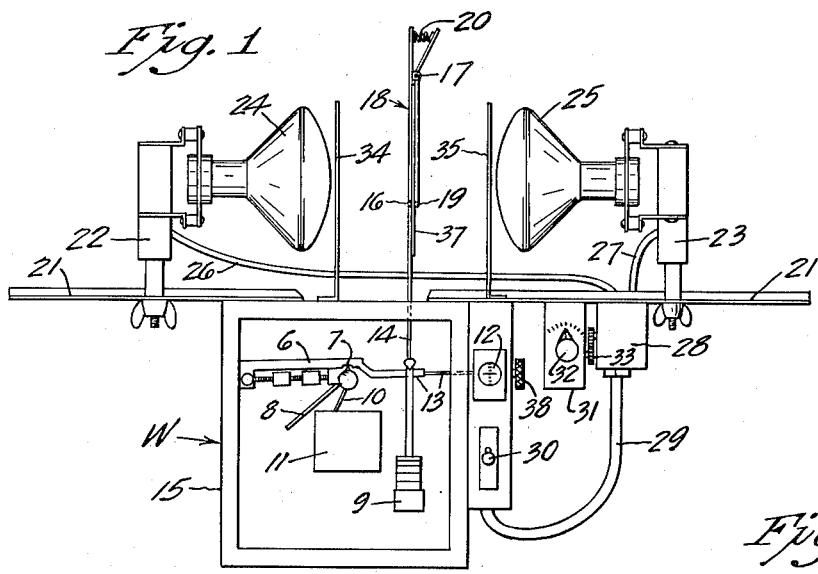
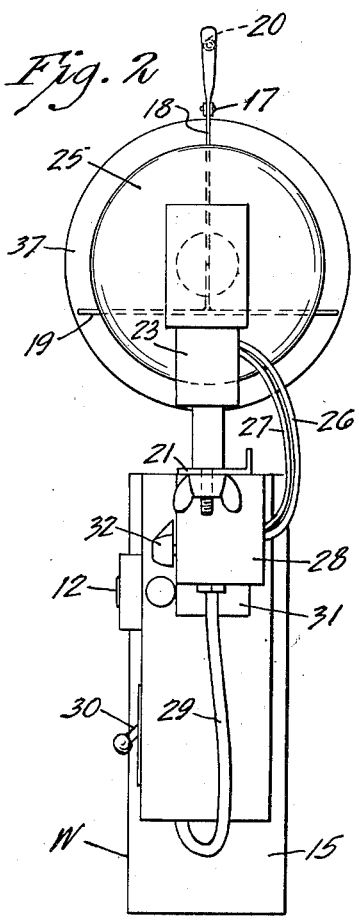
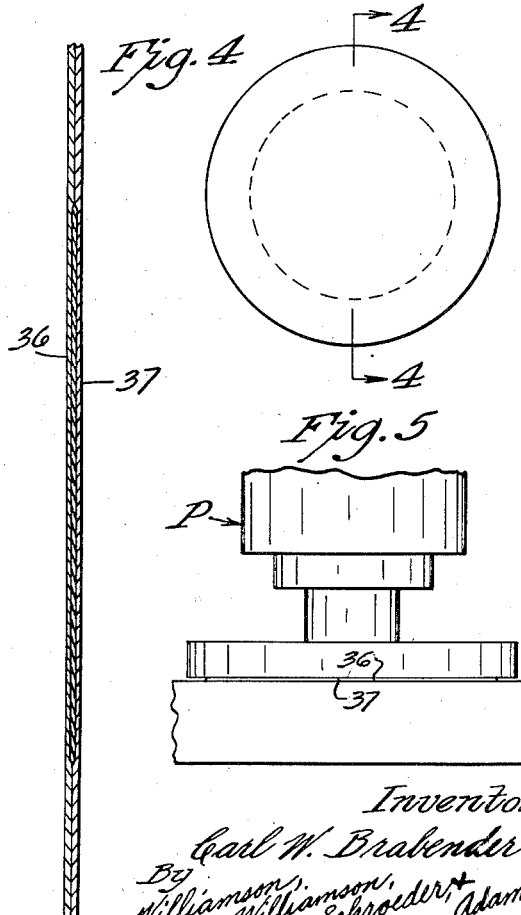
Inventor
Carl W. Brabender
By Williamson, Williamson,
Schroeder, + Adams
Attorneys

United States Patent Office 2,780,095
Patented Feb. 5, 1957

2,780,095

METHOD AND APPARATUS FOR DETERMINING THE SOLID CONTENT OF MATERIALS

Carl W. Brabender, Minneapolis, Minn., assignor to Pillsbury Mills, Inc., Minneapolis, Minn., a corporation of Delaware Application August 19, 1953, Serial No. 375,203

6 Claims. (Cl. 73—76)

This invention relates to apparatus and methods for determining the solid content of a non-flowable material. More particularly, it relates to methods and apparatus for quickly determining the liquid and volatile contents of a sample material.

In recent years, a considerable number of devices have been invented to facilitate the determination of the moisture content of pulverulent material such as flour and the like. Very few, if any, such inventions, however, are adaptable for use in determining the moisture content of soft malleable or plastic materials such as baker's dough. It is important in determining optimum baking conditions that knowledge of the moisture content of dough and similar substances be obtainable. My invention is directed toward providing novel methods and apparatus which will facilitate the determination of the moisture content of such a material. One inherent difficulty in determining the moisture content of a sample of material such as baker's dough which normally has a relatively high moisture content as compared to flour or some other pulverulent material, is that such a specimen, when submitted to a dry heat, will inevitably have its outer surface formed into a type of crust which, after its formation, substantially retards the outward passage of moisture from the remainder of the sample. The formation of such a crust tends to substantially increase the length of time required to drive all of the moisture from such a sample through the application of external heat. Under ordinary methods, it is common for a determination of the moisture content of baker's dough to consume a period of approximately four hours before all of the moisture has been driven therefrom successfully. My invention is directed toward providing novel methods for conditioning a sample of such a material so as to overcome these difficulties.

In mixing baker's dough for use at pre-set baking conditions and in the determining of ideal baking conditions for a particular mixture of such dough, it is important to know the moisture content of the dough material. It may also be important in some cases to know the quantity of volatile material in a doughy material. To determine the liquid content of the dough, the common procedure is to weigh a sample of dough, and then drive off the liquid thereof and weigh the sample to determine the solid content thereof, and the difference between the former and latter measurements will be the quantity of liquid in the sample, and the proportions of the ingredients in the dough may be changed or the baking conditions may be changed to compensate for any differentiations from the desired nature of the material. Although at present, it is the moisture content which is the important determination to be made concerning the dough, it is well within conception that it may be highly important to know the solid content of the sample.

It is a general object of my invention to provide novel and improved methods and apparatus for determining the solid content of a sample of malleable material.

A more specific object is to provide novel methods and apparatus for quickly and efficiently determining the moisture content of a malleable material such as baker's dough.

Another object is to provide novel and improved methods for preparing a sample of malleable material in order to condition the same for a quick and efficient drying operation in which the liquid and volatile contents thereof may be driven off.

Another object is to provide novel and improved apparatus for quickly and efficiently determining the moisture content of a sample of malleable material after it has been so conditioned.

Another object is to provide novel methods for driving off the liquid and volatile contents of a sample of malleable material within a minimum period of time.

Another object is to provide novel methods for conditioning a sample of malleable material so that a drying operation during which the volatile and liquid contents thereof are driven outwardly therefrom may be accomplished within a minimum period of time.

Another object is to provide a novel method for applying heat to a sample of material, the moisture content of which is to be determined in order to substantially reduce the amount of time during which such a sample must be subjected to the heat source in order to accomplish complete drying of the same.

Another object is to provide a novel method for varying the intensity of the heat during a drying operation within which the moisture content of a sample is to be driven from the sample.

Another object is to provide novel apparatus for simultaneously supporting and weighing a sample of doughy material during a drying stage and the weighing stage of a moisture-determining operation of such a sample.

These and other objects and advantages will more fully appear from the following description made in connection with the accompanying drawings wherein like reference characters refer to the same parts throughout the several views and in which:

Fig. 1 is a side elevational view of one embodiment of my invention;

Fig. 2 is an end elevational view of the same;

Fig. 3 is a plan view of two filter papers with a sample compressed therebetween;

Fig. 4 is a sectional view taken along line 4—4 of Fig. 3; and

Fig. 5 is a fragmentary diagrammatic view illustrating portions of a hydraulic press utilized to compress the sample between two filter papers at high pressures.

One embodiment of my invention may include, as shown in Figs. 1–5, a weighing mechanism indicated generally as W. This weighing mechanism as shown may include a steel-yard 6 pivotally mounted on a shaft 7 and having a counter-bar 8 and a counter-weight 9. A damping vane 10 extends downwardly into an oil filled vessel 11. An illuminated scale 12 is positioned at the right hand portion of the mechanism and an indicator 13 extends laterally thereto from the steelyard 6. The illuminated scale 12 is graduated to show the moisture loss or gain in percentage by direct readings for a sample of a predetermined weight. A weighing mechanism of the type disclosed in Patent No. 2,047,765 issued to me on July 14, 1936 may be utilized if desired and reference may be made thereto for future details of construction of the weighing mechanism.

As shown, the weighing mechanism W includes an upstanding support 14 which is connected to the indicator 13 and extends upwardly through the housing 15 of the weighing mechanism. Mounted on the medial portion of the upstanding support 14 is a cross bar 16 which extends laterally from each side of the support to form a type of cross therewith. Pivotally mounted upon the upper portion of the support 14 as at 17 is a clamp member 18 which has a cross bar 19 at its lower end corresponding to the cross bar 16 of the upstanding support. A spring 20 urges the cross bar 19 into cooperative engaging relation with the support 14 and its cross bar 16 at all times. The clamp member 18, it can be seen, is in effect in the shape of an inverted T.

Mounted on the weighing mechanism W is a track 21. A pair of mounting brackets 22 and 23 are slidably mounted on this track and are capable of being adjusted to various positions along the length thereof. Mounting brackets 22 and 23 carry a pair of infra-red lamps 24 and 25 which are directed toward each other as best shown in Fig. 1. The two lamps are connected by lead wires 26 and 27 to a rheostat 28 which in turn is electrically connected by a main line 29 to a switch 30 carried on the side of the weighing mechanism below the illuminated scale 12. This switch 30 is adapted to be connected to a source of electrical power (not shown).

Mounted on the track 21 adjacent the rheostat 28 is a timing mechanism 31 provided with a setting knob 32. This timer 31 is connected by a gear mechanism 33 to the rheostat 28 so that when the timer is set it drivably adjusts the rheostat to vary the resistance offered thereby to an electrical current passing through the lamps 24 and 25. The timer 31 and the rheostat 28 are so connected by the gear mechanism 33 that a minimum of resistance is offered by the rheostat 28 at the initial set position of the timing mechanism and so that the resistance offered by the rheostat will be gradually increased as time elapses during the operation of the timing mechanism. In this manner, a minimum of resistance is offered during the initial stages of a drying period so that the lamps will produce the most intense heat during that portion of the drying operation and the heat will be gradually reduced as the drying operation progresses.

The lamps 24 and 25 used in the apparatus shown are approximately 1,500 watt lamps and a source of electrical power having 220 volts is utilized. The resistance offered by the rheostat is such as to permit a current of approximately 13 amperes to pass through the lamps during the initial stages of the drying operation and then drop down to 2½ amperes at the close of the drying operation. The rheostat shown is of the type having 5 different positions which permit 13, 5, 4, 3¼ and 2½ amperes to pass through the lamps respectively at the various positions. From this it can be seen that when the timing mechanism moves the rheostat from position No. 1 to position No. 2 a very substantial reduction in amperage is effected and thus the danger of burning or scorching is eliminated.

Mounted on the track and extending upwardly in front of the lamps 24 and 25 is a pair of infra-red glass filters 34 and 35. As shown, these infra-red glass filters are positioned about ¼ inch from their respective lamp and the lamps are each positioned about 3½ inches from the clamp 18. It is important, in order to avoid scorching and/or burning of the sample, that the lamps be positioned at the correct distance from the sample and that the intensity of the lamps be sufficient to effect the drying operation quickly without scorching. It is also important, of course, that the drying operation be conducted over a correct length of time.

In effecting the drying operation, a pair of filter papers 36 and 37 of known bone dry weight which are ordinarily of a thickness of approximately .009 of an inch, are placed into position between the lamps 24 and 25 and held by the clamp 18, and the weighing mechanism is then adjusted through manipulation of the knob 38 adjacent the scale 12 to correct for the bone dry weight of these filter papers. This eliminates the possibility of the weight of the filter paper from affecting the accuracy of the determination. If a larger number of filter papers of uniform size and weight can be obtained, the scale can be adjusted for a pair of filter papers from such a group and thereafter need not be adjusted for each determination.

After the filter papers 36 and 37 have been weighed and the weighing mechanism has been adjusted as described above, a sample of the material the moisture content of which is to be determined is placed upon the central portion of one of the filter papers and the other is placed thereover so that the sample will be positioned between the two papers. The sample and the two filter papers are then placed within a hydraulic press indicated generally as P in Fig. 5 and pressure is applied thereto. I have found that the application of pressure of approximately 20 tons for a period of a few seconds is ample to cause the sample to flatten out into a very thin layer and to cause a substantial portion of the moisture originally contained in the sample to be squeezed out of the sample and dissipated to the more marginal portions of the two filter papers 36 and 37. I have found that a pressure of 5 tons is adequate if a sample of bread dough of a consistency of 500 Brabender units is allowed to remain at such a pressure for a period of fifteen seconds. In any event, a sample of any material to be tested should be flattened into a layer less than one thirty-second (1/32) of an inch. The pressure required for such flattening may be reduced if the pressure is applied for longer periods of time. The result of the application of such pressure, it is found, is that the combined thickness of the two filter papers 36 and 37 is approximately .0016 of an inch.

After the sample has been pressed into a flat thin layer as shown in Fig. 4 between the two filter papers 36 and 37, they are secured to the support 16 by means of the clamp 18. The transverse bars 16 and 19 serve to engage the sample therebetween and hold the sample and the filter papers so that they will extend transversely to the direction of the heat thrown off by the lamps 24 and 25 and midway therebetween.

After the sample has been so positioned between the lamps, the switch 30 is closed and the timing mechanism 31 is set by turning the knob 32 to the desired time. The time selected will depend upon the weight of the sample which will have a predetermined weight such as 5 to 10 grams. The scale 12 of course, will also be composed for a sample of the predetermined weight selected. As explained previously, a result of setting the timing mechanism 31 will be the passage of a relatively high current through the lamps 24 and 25 so that a relatively intense heat will be generated during the initial stages of the drying operation. As time lapses and the timing mechanism progresses, the rheostat 28 is controlled through the gear mechanism 33 so that the resistance offered to the current passing through the main line 29 and the lead lines 26 and 27 will be increased and hence the heat generated by the lamps 24 and 25 will be gradually reduced so that the heat applied to the sample between the two filter papers 36 and 37 will be gradually reduced as the heating operation progresses.

The drying operation is continued until the reading on the scale 12 remains the same for a considerable period such as approximately one minute. When the scale fails to show variations or loss of moisture as a result of the heating, the user is apprised that the drying operation has been completed and he can readily determine the moisture which is driven off as a result of the drying operation through reference to the scale 12. This scale 12 will indicate the loss of moisture in percentage. I have found that a 5 gram sample of baker's dough, for example, can be completely dried and the determination can be completed within a 3–5 minute period. Such relatively quick determination in many instances effect a saving of thousands of dollars, for the user can be quickly apprised of the moisture content of the material without waiting for a 4 hour determination. A lapse of 4 hours may well mean a loss of thousands of dollars before proper adjustments can be made to correct undesirable moisture content.

The principal advantages effected through my invention stem from the great reduction in time required to accurately determine the moisture content of such a doughy material. This great reduction in time is the result of at least two different phases of my invention. The first phase is that method which I utilize for preparing the sample for determining the moisture content thereof. This includes the placing of the sample between the filter papers and compressing the same at unusually high pressure in order to cause a substantial portion of the moisture of a sample to be distributed throughout the more marginal portions of the filter papers from whence it can be readily evaporated without delay and without being retained through the formation of a crust on the outer surface of the sample itself. By subjecting the sample to high pressure while positioned between the filter paper prior to any drying operation, much of the moisture is squeezed into the filter papers from whence it will readily evaporate when subjected to dry heat. This is in contrast to what will take place if the moisture is permitted to remain within the sample until the drying operation is commenced, for then, as previously described, a crust tends to form on the outer surface of the sample which serves to retain moisture within the sample and necessarily extends the drying operation over a period of several hours. Furthermore, by applying the pressure to the sample, the sample is flattened into an extremely thin form so as to reduce to a minimum the retarding action of the surface crust which will normally form when the actual drying operation begins. In other words, it can be readily seen that whatever moisture does remain within the interior of the sample can more readily pass outwardly through the outer surface of the sample during the initial stages of the drying operation.

A second phase of my invention which substantially reduces the time required to determine the moisture content of a doughy sample such as baker's dough, is the application of intense heat during the initial stages of the drying operation and the application of less intense heat during the subsequent and final stages of the drying operation. I have found that so long as there is an abundance of moisture present at the surface of the sample which is exposed to the source of heat during the drying operation, there is do danger of scorching or burning which will effect the weight of the sample and bring in inaccuracies in the determination. However, if and when the outer surface of the sample becomes dry, there is immediate danger of scorching and burning of the sample if intense heat is being applied. Therefore, I have constructed my apparatus so as to apply intense heat to the sample during only the initial stages of the drying operation. In this manner I accomplish a maximum withdrawal of moisture from the sample during the initial stages of the operation without any danger of scorching or burning. After this stage has passed, a less intense heat is applied to the sample so that no scorching or burning will take place. By applying the heat in this novel manner I have found that the time required for driving off the moisture of such a sample may be substantially reduced. Of course, the combination of conditioning the sample as described in the preceding paragraph and the application of heat in the manner described herein reduces to a minimum the amount of time required to effect the moisture content determination.

It will, of course, be understood that various changes may be made in the form, details, arrangement and proportions of the various parts without departing from the scope of my invention.

What is claimed is:

1. The method of quickly driving off the non-solid components of a malleable material consisting in placing a sample of such material between two sheets of liquid-absorbent material, compressing such sample between said sheets under a pressure in excess of five tons per square inch for at least several seconds and thereby causing at least a portion of the liquid content thereof to be absorbed into said sheets wherefrom it may be readily evaporated through the application of dry heat thereto, then applying to said sheet and said sample dry heat of a temperature slightly below the combustion temperature of such material and said sheet during only the initial stages of the drying operation, and during the latter stages of the drying operation, applying a less intense heat to such material and such sheets until all of the non-solid components of said sample have been driven off therefrom.

2. In apparatus for determining the moisture content of a malleable material, the combination of a weighing device, a clamp support carried by said weighing device in weighing relation, clamp structure mounted on said support and adapted to engage and hold in cooperation with said support a flattened sample of material the moisture content of which is to be determined, an electric heat lamp mounted adjacent said clamp structure and directed thereat to effect rapid drying of such a sample when the latter is so held by said clamp structure, said weighing device being adapted to weigh such a sample when so held by said clamp structure both before and after the drying operation, a timing mechanism, a rheostat electrically connected with said lamp and adapted to connect the latter with a source of electrical power, and mechanism connecting said timer mechanism with said rheostat and controlling the same to increase the resistance offered thereby to a flow of electric current to said lamp as the drying operation progresses whereby the heat generated by said lamp will be more intense during the initial stages of the drying operation than during the latter stages.

3. In apparatus for use with a weighing mechanism having clamping means connected therewith in weighable relation in determining the solid content of a sample of malleable material formed into a flat and thin sheet form, the combination including a pair of liquid-absorbing sheets securable to such a weighing mechanism by said clamping means and being mounted in adhering and liquid-absorbing relation on opposite sides of the sample for securing the same on the weighing mechanism to permit continuing determination of changes of weight thereof and for absorbing and carrying away liquid from the sample, and a source of radiant drying heat disposed in spaced relation with said sheets and being directed toward the sample and said sheets from opposite sides thereof to evaporate the liquid in said sheets and to penetrate said sample from both sides for drying the same, whereby the sample may be dried without scorching thereof.

4. The method of quickly driving off the non-solid components of a malleable material consisting in placing a sample of such material upon the surface of a sheet of liquid-absorbing material, working such sample into a flat and thin sheet form over the surface of said liquid-absorbing sheet to expose a maximum of surface area of said sample to said sheet which will absorb at least a portion of the liquid content of the sample and will carry the liquid away from the sample wherefrom it may be readily evaporated through application of dry heat thereto, then applying to said sheet and the sample dry heat of a temperature slightly below the combustion temperature of such material and said sheet during only the initial stages of the drying operation, and during the latter stages of the drying operation, applying a less intense heat to such material and said sheet until all of the non-solid components of said sample have been driven therefrom.

5. In apparatus for determining the moisture content of a sample of known weight of malleable material, the combination of a weighing mechanism having means connected therewith for holding such a sample in weighable relation, a variable and controllable source of dry radiant heat mounted adjacent the weighing mechanism and directing heat toward the sample from opposite sides thereof simultaneously. electric control mechanism operably connected with said source of heat for varying the intensity of heat output therefrom, and timing mechanism connected with said electric control mechanism and controlling the same to cause more intense heat to be directed toward the sample during the initial stage of the drying operation than during the latter stages thereof.

6. In apparatus for determining the moisture content of a malleable material, a combination of a weighing device, a sample support carried by said weighing device in weighing relation, said support being adapted to engage and support a flattened sample of material, the moisture content of which is to be determined, an electric heat lamp mounted adjacent said support and directed at such a sample when the latter is supported by said support, said weighing device being adapted to weigh such a sample when so supported, both before and after the drying operation, a timing mechanism, a rheostat electrically connected with said lamp and adapted to connect the latter with a source of electric power, and mechanism connecting said timing mechanism with said rheostat and controlling the same to increase the resistance offered thereby to a flow of electrical current through said lamp as the drying operation progresses, whereby the heat generated by said lamp will be more intense during the initial stages of the drying operation than during the latter stages.

References Cited in the file of this patent

UNITED STATES PATENTS

| | | |
|---|---|---|
| 296,968 | Hyatt et al. | Apr. 15, 1884 |
| 491,545 | Gerard | Feb. 14, 1893 |
| 508,112 | Miller | Nov. 7, 1893 |
| 1,993,244 | Martin | Mar. 3, 1935 |
| 2,282,070 | Mahannah | May 5, 1942 |
| 2,569,749 | Dietert et al. | Oct. 2, 1951 |
| 2,622,438 | Campbell | Dec. 23, 1951 |